(No Model.)
C. A. FAURE.
APPLICATION OF ELECTRICITY TO CAR LIGHTING.
No. 379,567. Patented Mar. 20, 1888.
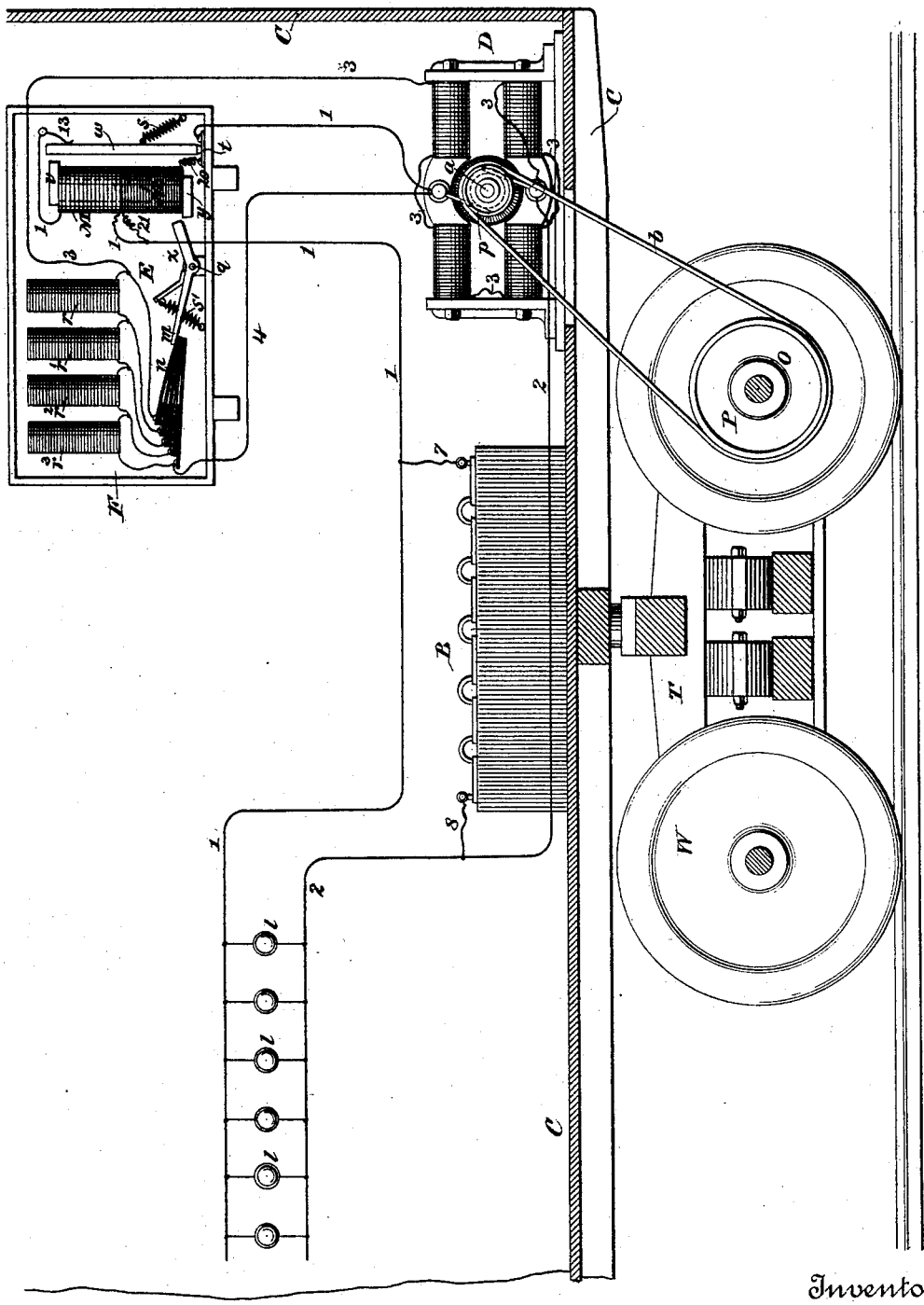
Witnesses
Geo. W. Breck
Edward Thorpe
Inventor,
Camille A. Faure,
By his Attorney
Wm B Vansize

UNITED STATES PATENT OFFICE.

CAMILLE A. FAURE, OF NEW YORK, N. Y., ASSIGNOR TO THE ELECTRICAL ACCUMULATOR COMPANY, OF NEW YORK.

APPLICATION OF ELECTRICITY TO CAR-LIGHTING.

SPECIFICATION forming part of Letters Patent No. 379,567, dated March 20, 1888.

Application filed November 16, 1887. Serial No. 255,308. (No model.) Patented in France November 9, 1881, No. 145,931.

*To all whom it may concern:*

Be it known that I, CAMILLE A. FAURE, a citizen of the Republic of France, and a resident of New York, in the county of New York and State of New York, have invented certain new and useful Improvements in Application of Electricity to Car-Lighting, (for which I have obtained Letters Patent in France, No. 145,931, dated November 9, 1881,) of which the following is a specification.

My invention is an improvement in the application of electricity to train or car lighting.

I provide a dynamo-electric machine arranged to be driven from the same source which furnishes power or energy to propel the train. This power is most conveniently applied by mechanically connecting the dynamo-armature with a wheel or axle of the car or vehicle upon which it is located. There is a main circuit fed by the dynamo and a series of lamps taking current from the main circuit, which are to be located at suitable intervals through the car or train of cars. I provide against the fluctuations due to possible variations in the application of power to the dynamo, and similar causes of fluctuation in current and of uncertainty in this system of lighting, by placing a secondary battery with its opposite terminals in connection with the opposite poles of the dynamo, respectively. In this way I charge the secondary battery with electricity, while the dynamo and the battery together jointly contribute to supply current to the lights, and in case of failure on the part of either dynamo or battery the one remaining intact furnishes the current to keep the lamps in operation. In case of failure of the current from the dynamo the battery would establish a current through the armature which would rapidly exhaust the energy of the battery and probably injure the dynamo. To avoid trouble from this cause I place an electro-magnetic circuit-changer in the main circuit between the dynamo and battery, which operates to break the main circuit at that point upon a variation in current from the dynamo exceeding certain predetermined limits, and to close said circuit again only when the electro-motive force from the dynamo has risen to a point sufficiently high to impart a current of charge to the secondary battery. In case this switch is called into operation the battery is immediately and automatically substituted for the dynamo as a source of electrical energy to supply the lamps. The dynamo is a "shunt-wound" dynamo—that is, one having its field-coils in a derived circuit. By varying the resistance of this derived circuit I vary the strength of field magnetism, thus varying the electro-motive force of the dynamo; and in order that I may preserve this at a substantially uniform point I provide an automatic switch for varying the resistance in the derived circuit, operated by variations of current in the main circuit. This consists of an electro-magnet located in the main circuit operating a switch-arm to introduce or withdraw an artificial resistance in the derived circuit. I preferably combine this with the electro-magnetic switch heretofore described for operating a circuit-breaker to make and break the main circuit. Thus this apparatus comprises an automatic mechanism for making or breaking the main circuit upon a predetermined variation of current and for regulating the strength of current due to the operation of the dynamo.

I will now describe my improvement by reference to the accompanying drawings.

C is a sectional elevation of a car, showing the truck T, having wheels W and axle $o$. In one corner of the car is a shunt-wound dynamo-electric machine, D, having its armature upon an arbor, $a$. There is a pulley, $p$, on the armature-arbor and a pulley, P, on the truck-axle, a belt, $b$, connecting the two pulleys, so that one rotates with the other. Any other manner of mechanically connecting the armature with a wheel or axle of the train may be substituted, as may any equivalent means whereby the dynamo is driven from the source of energy propelling the train.

From the dynamo main conductors 1 2 are carried through the car or train of cars, and a series of lamps, $l\,l$, are appropriately located, preferably connected to the main conductors in multiple arc, as shown. To provide against a possible failure of current from the dynamo and to supply electrical energy during a stoppage of the train, I connect a secondary battery or accumulator in a separate circuit, 7 8, between the opposite poles of the dynamo. In this way the battery steadies or regulates the current due to the dynamo and guards against failure or fluctuation of the light due to the variations in the motive power driving the dynamo or to other causes. The dynamo when operating acts to charge the battery, and also supplies current to the lamps.

The automatic switch and regulator E consists of an electro-magnet having two coils, M M', and a permanent magnet, $w$, pivoted at $t$. One coil, M', is of fine wire and is in a branch circuit, 20 21. The coarse-wire coil M is in the main lead 1, which passes through the break-point 13. Armature $w$ is normally retracted by the spring $s$. The magnet is furnished with extension pole-pieces $v$ and $y$.

The automatic regulator consists of an artificial resistance in the shunt-circuit 3 4, containing the field-coils of the dynamo. This artificial resistance is in sections $r$ $r'$, &c., and there is a series of spring-blades, $n$, insulated from each other, each blade electrically connected to a different point in the shunt or derived circuit. The electro-magnet has an armature, $x$, pivoted at $q$ and normally held in a retracted position by the spring $s'$, which presses the armature-bar $m$ into contact with the free ends of the spring-blades $n$, thus bringing them into electrical contact and cutting out the artificial resistances. When the strength of current in the coils of the magnet equals or exceeds a certain predetermined point, armature $x$ is attracted and moves against the force of spring $s'$, thus decreasing pressure upon the spring-blades and introducing more or less resistance. The automatic apparatus is inclosed in a box or frame, F, and fixed to the side of the car.

The operation of the system may be described as follows: As the car moves, the axle and pulley P rotate, thus rotating the armature of the dynamo, which, while a certain speed of rotation is maintained, generates a current of electricity having an electro-motive force sufficient to charge the battery B and raise lamps $l$ $l$ to incandescence. When this is the case, the apparatus occupies the position shown in the drawings. The polarized armature $w$ being repelled and retracted, the main circuit is closed at point 13. When the speed of the car and the rotation of the dynamo-armature exceeds this normal rate, the coils M' and M conspire to attract armature $x$ against the force of spring $s'$, and an artificial resistance is introduced into shunt-circuit 3 4, which tends to reduce the force of the current from the dynamo.

If the speed drops below the normal, the attractive force exerted by the magnet on $x$ will decrease and the spring $s'$ will more strongly compress spring-blades $n$, thus reducing resistance in the shunt circuit 3 4, tending to increase the strength of current in the derived circuit and the force of the current in the main circuit.

If the dynamo speed slow down to a point where the counter electro-motive force due to battery B exceeds the electro-motive force due to the dynamo, the reversal of current in the main circuit will cause the magnet to attract its polarized armature $w$ and break circuit at point 13, thus rendering the return current from battery B harmless. There is no intermittence in the lights $l$ $l$, however, for the battery B now acts as a source of electricity, supplying the lights until exhausted, or until the dynamo again starts into operation.

What I claim, and desire to secure by Letters Patent, is—

1. In a system of lighting by electricity, the combination of a dynamo-electric machine, main conductors connected thereto, a series of electric lamps, and a secondary battery in parallel circuit with the dynamo, and a polarized electro-magnet operating a circuit-breaker located in the main circuit between the dynamo and battery.

2. The combination of a car or vehicle, a dynamo-electric machine having its armature mechanically connected with an axle of said vehicle, a secondary battery carried by said vehicle and electrically connected with said dynamo, and means for varying the strength of the field-magnetism of said dynamo whereby the dynamo may be used to charge the battery, substantially as set forth.

3. The combination of a dynamo-electric machine having its armature mechanically connected with a wheel or axle of a moving car, a secondary battery in circuit therewith, a derived circuit containing the field-coils of the dynamo, and means for varying the resistance of said circuit.

4. The combination of a dynamo-electric machine having its armature mechanically connected with an axle of a moving car, a secondary battery in circuit therewith, a derived circuit containing the field-coils of the dynamo, and an automatic switch for varying the resistance of the derived circuit controlled by an electro-magnet in the main circuit.

5. The combination of a dynamo-electric machine having its armature mechanically connected with an axle of a car or vehicle, a secondary battery in circuit therewith, a separate circuit containing the field-coils of the dynamo, a circuit-closer in the main circuit, a variable resistance in the derived circuit, and means for automatically controlling the operation of said circuit closer and for introducing and withdrawing said resistance, substantially as described.

6. The combination of a dynamo-electric machine having its armature mechanically connected with a wheel or axle of a car or vehicle, a secondary battery in circuit therewith, a separate circuit containing the field-coils of the dynamo, a circuit-breaker in the main circuit, a variable resistance in said separate circuit, and an electro-magnet in the main circuit operating to make and break the main circuit and to introduce and withdraw said resistance with respect to the separate circuit.

7. The combination of a dynamo-electric machine, a secondary battery, an electric circuit uniting the dynamo and battery, a circuit-breaker in the main circuit, and a polarized electro-magnet having two coils, one of which is located in the main circuit and the other in a derived circuit, said coils co-operating to control the movements of said circuit-breaker.

Signed at New York, in the county of New York and State of New York, this 15th day of November, A. D. 1887.

CAMILLE A. FAURE.

Witnesses:
 DANIEL E. DELAVAN,
 WM. B. VANSIZE.